United States Patent [19]
Stedman

[11] 3,822,923
[45] July 9, 1974

[54] MASTER TRACK LINK
[75] Inventor: Robert N. Stedman, Chillicothe, Ill.
[73] Assignee: Caterpillar Tractor Co., Peoria, Ill.
[22] Filed: Nov. 30, 1972
[21] Appl. No.: 310,870

[52] U.S. Cl. .............................................. 305/58
[51] Int. Cl. ........................ B62d 55/20, F16g 13/06
[58] Field of Search .................... 305/58, 39; 74/258

[56] References Cited
UNITED STATES PATENTS

| | | | |
|---|---|---|---|
| 2,882,102 | 4/1959 | Rund | 305/58 X |
| 3,020,096 | 2/1962 | Strnad | 305/58 X |
| 3,096,661 | 7/1963 | Reinsma | 305/58 |
| 3,427,079 | 2/1969 | Skromme | 305/58 |

Primary Examiner—Richard J. Johnson
Attorney, Agent, or Firm—Phillips, Moore, Weissenberger

[57] ABSTRACT

A two-piece master track link for an articulated, shoe-supported, heavy-duty track chain wherein the master link is parted along an oblique, longitudinally extending juncture of separation, the complementing surfaces of each portion of said link contain at least one arcuate notch, said notches registering to form a seat for a cylindrical key capable of maintaining alignment and absorbing longitudinal shear loads occurring between the two link portions, each key having relieved areas to allow passage of a bolt extending through the track shoe and one link portion of the other link portion to threadably secure the master link portions, key, shoe, and chain ends to form an integral chain assembly.

10 Claims, 5 Drawing Figures 3,822,923

MASTER TRACK LINK

BACKGROUND OF THE INVENTION

This invention relates to master links used to couple the ends of articulated endless track chains employed with crawler tractors.

Endless track chains employed on crawler-type vehicles normally comprise a plurality of track shoes and spaced supporting links which are pivotally connected by means of hinge pins and bushings. It is conventional to provide a master pin or a master link in each of the complementing link chains to facilitate assembly and disassembly of the endless track when service is required. Master links normally comprise two link half sections with mating surfaces that interlock through the provision of mating notches or serrated surfaces. Each interconnected chain link is subject to extremely high tensile forces which result from the driving engagement of the sprocket and hinge joints. It is a prerequisite that the master links afford maximum durability and convenient service to minimize costly downtime.

Prior art two-piece master track links disclosed in U.S. Pats. No. 3,427,079 and 3,096,661, of common assignment herewith, have proven functionally effective. However, such links have been found difficult and costly to manufacture. Close tolerances are required to assure optimum coupling of the interlocking surfaces and alignment of the bolts which secure the track shoes and cooperating link sections. Without a tight fit to minimize flexing between link sections, concentrated stress loads and malfunction of hinge joints can occur with consequent progressive deterioration of the entire track chain. Contour grinding is an effective way of attaining the required precision machining of the extremely hard link members but such grinding is time consuming, costly and involved because the complex and expensive grinding wheel must be frequently refinished to maintain the desired tolerances.

To minimize such manufacturing problems as posed by the prior art master track links, the instant two-piece link has been provided with a configuration which may be readily produced by more common machining procedures. With suitable fixtures, the mating surfaces of the two link portions can be readily finished on vertical mills in a relatively economical manner. Semicylindrical notches which register with corresponding complementing notches in the associated link portion and receive close nesting cylindrical lock and shear keys can be readily and economically broached in a fixture within a broaching machine. Cylindrical shear keys are utilized which are readily aligned and engaged to effect the interlocking coupling of the two link portions. Such keys are economical and are readily provided with diametral bores which receive bolts used to secure the two link portions and shoe to form an integral track link capable of withstanding high drawbar or tensile loading.

SUMMARY OF THE INVENTION

The present invention provides a two-piece master track link which incorporates the above-noted manufacturing and functional advantages.

Two separable link portions having an arcuate, basically diagonal juncture of separation in their complementing surfaces are provided with semicylindrical seats which register with like seats in the opposite link portion to receive one or more close fitting cylindrical keys. The keys have apertures or notches to allow passage of bolts through one link portion past the keys to engage the other link portion for securing a complementing track shoe and the cylindrical shear keys to produce a durable operating connection between the two complementing link portions.

DETAILED DESCRIPTION

Figure 1:
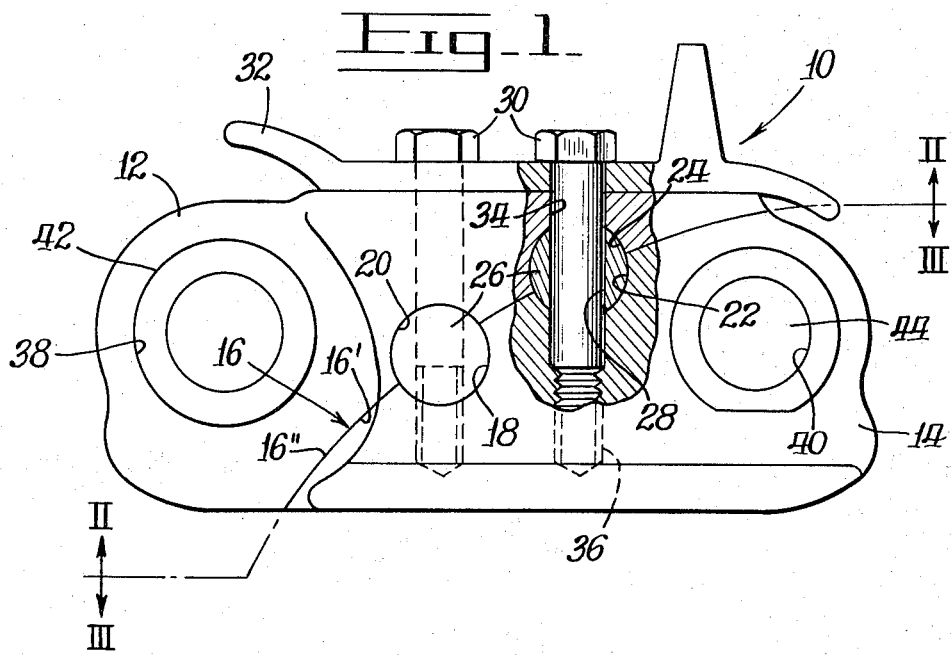
FIG. 1 is a side elevation of an assembled master track link embodying the present invention.

Referring to FIG. 1, the subject two-piece master track link indicated at 10 comprises two overlapping link portions or halves 12 and 14 which have an arcuate mating diagonal juncture 16. At intermediate points along juncture 16, pairs of longitudinally spaced, semicylindrical notches 18, 20, 22 and 24 are broached respectively in link portions 12 and 14 so that in assembled condition the notches register with corresponding notches on the opposite half. The bores thus formed receive cylindrical shear keys 26 which serve to index the two mating surfaces and absorb shear loads when the assembled master link is placed in tension during operation.

The keys 26 are provided with suitable diametral bores 28 which accept the bolts 30 which bolts initially pass through and retain track shoe 32. The oversize bores 34 in link portion 12 guide the bolts through the keys 26 and subsequently into the threaded holes 36 in link portion 14 to form an effective integrated master track link. Link portions 12 and 14 are provided respectively with suitable bores 38 and 40 which receive, by press fit, a tubular bushing 42 which in turn receives a coaxially disposed pin 44 to form the hinged joints which articulately connect the longitudinally overlapping and spaced-apart links which form the endless track chain.

Figure 2:
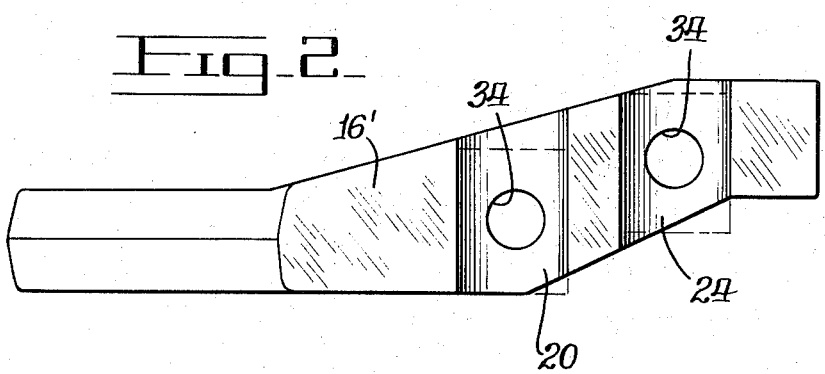
FIG. 2 is a bottom plan view of the outer link portion taken along projection line II—II of FIG. 1.
Figure 3:
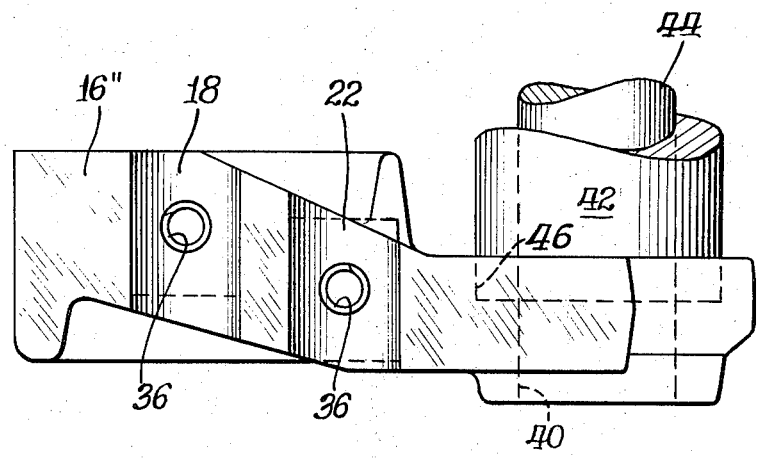
FIG. 3 is a top plan view of the inner link taken along the line III—III of FIG. 1 and showing the semicylindrical notches and tapped holes provided for receiving the locking bolts used to secure the track shoe and link portions.

Referring to FIGS. 2 and 3, it will be noted that the extreme ends of link halves 12 and 14 are longitudinally offset, as is common with all high drawbar-type track chains, to allow satisfactory passage and nesting of the bushings 42 in counterbore 46 which are provided inwardly of the pin bore 40. Arcuate surface 16' of the outer link portion tightly abuts a mating surface 16'' as shown in FIG. 3. Upon securement of bolts 30, such mating contact assures that no rocking or shifting can occur to initiate premature loosening and deterioration of the link structure. Broached seats 18, 20, 22, and 24 are accurately aligned longitudinally by conveniently inserting the keys 26. The axial length of keys 26 are diameters of the diametral bores 28 which receive the bolts are such that both axial and radial alignment of the key members can be readily accomplished.

Figure 4:
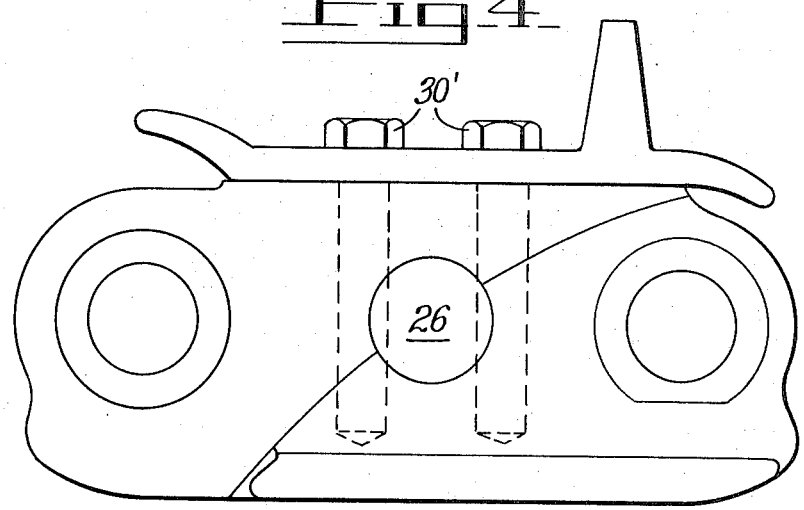
FIG. 4 is another side elevation of a modified track link wherein a single shear key is employed to index the two link portions.

Referring now to FIG. 4, a basically similar, two-piece master track link employing arcuate mating juncture surfaces is adapted to receive a single shear indexing key 26, which key is disposed at a point intermediate track shoe securing bolts 30'. Notches provided on diametrically opposite sides of the key, or an annular groove may be provided in the key to afford ready passage of the bolts therepast to axially retain the key.

Figure 5:
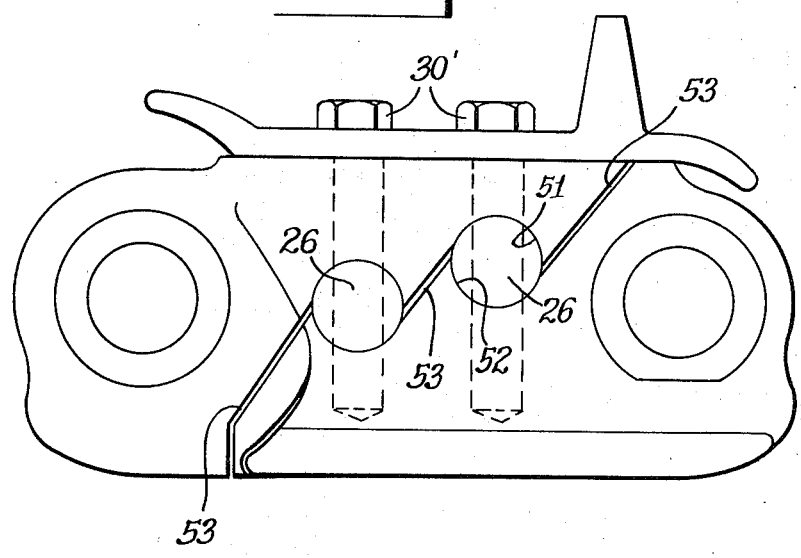
FIG. 5 is another modified master track link employing double indexing shear keys between link portions that have been formed by plasma arc cutting a stepped juncture.

With reference to FIG. 5, a slightly modified, two-piece master track link is shown wherein a single-piece cast or forged track link is cut in a stepped pattern such that complementing shoulders 51, 52 are afforded for a pair of cylindrical indexing keys 26. With the advent of plasma arc cutting torches, relatively fine accurate cuts can be effected to achieve separation of such structural members. Slightly smaller diameter shear keys are employed in this embodiment to insure satisfactory abutment of the mating surfaces of the two link halves. Since most indexing and absorption of the shear loads are accomplished by the cylindrical keys 26, substantial clearances 52 can be afforded in the stepped juncture between the link portions and in the bolt holes and cylindrical diametral bores without serious detrimental effect upon the alignment of the link portions, track shoes, or hinge joint members.

The keys 26 are self-seating when installed. Because of this design attribute, a slight rolling action of the keys which would inherently occur under shear or tensile loading will urge the complete separation of the link portions upon release of the fastening bolts.

It should be noted that arcuate surfaces of a uniform cylindrical plane for the link juncture surfaces, such as those shown in FIGS. 1–4, are preferred because with suitable fixtures either link portion can be economically machined on a vertical rotary mill. By affixing cutters about the periphery of the table, the convex inner link portion can be machined as the table rotates. Conversely, the outer portion of the link portion can be adapted tangentially to the outer periphery of the rotating table to allow cutting tools mounted on the vertical mill rotating table to also machine mating concave surfaces.

In such a machining procedure, conventional carbide cutters can satisfactorily mill the two notched arcuate surfaces of the hardened link halves most conveniently and accurately. The size of the rotating table of such vertical mill is such that a multitude of the link portions can be satisfactorily affixed to or placed about the table's periphery to allow continuous removal and replacement of the link portions without undue inconvenience. Because the carbide cutters employed to machine the arcuate mating surfaces of the link portions are more durable than sensitive precision grinding wheels, the subject master link lends itself readily to more economical and effective manufacture.

In view of the foregoing, it is readily apparent that the structure of the present invention provides a superior master link structure which is capable of withstanding even the most severe operational loading conditions while at the same time being economically fabricated by means of relatively inexpensive equipment and machining operations.

While the invention has been described and shown with particular reference to the preferred embodiments, it will be apparent that variations are possible which would fall within the spirit of the present invention, which invention is not intended to be limited, except by the scope of the appended claims.

What is claimed is:

1. A master track link for joining two ends of a track chain together comprising; a first link portion, a second link portion, said first and second link portions having facing complementary surface means for defining a juncture of separation completely through said master track link, fastening means for connecting said first link portion to said second link portion, said complementary surface means including notch means formed in each of said first and second link portions in opposed cooperating relationship for interrupting said juncture of separation, and key means positionable in said notch means for resisting separation of said first and second link portions along said juncture of separation when said master track link is placed in tension, said fastening means including bolt means extending at least partially through said key means for axially retaining said key means in place.

2. The master track link defined in claim 1 wherein said key means is cylindrical.

3. The invention of claim 1 wherein the notch means include at least two notches and the key means include at least two keys.

4. The invention defined in claim 1 wherein said bolt means extends completely through said key means.

5. The invention defined in claim 1 wherein said bolt means extends only through an outer surface portion of said key means.

6. The invention defined in claim 1 wherein said master track link has inner end and outer edges and wherein said juncture of separation extends from the inner edge to the outer edge.

7. The invention defined in claim 6 wherein said juncture of separation extends generally diagonally across the master track link.

8. The invention defined in claim 6 wherein said juncture of separation is arcuate.

9. The invention defined in claim 6 wherein said juncture of separation defines spaced discontinuous line segments joined by said notch means.

10. The invention of claim 9 wherein said spaced discontinuous line segments define interengaging complementary steps interconnected by said notch means.

* * * * *